United States Patent [19]

Thomas, Jr.

[11] Patent Number: 4,899,981
[45] Date of Patent: Feb. 13, 1990

[54] IN-RUN CLEANABLE ORIFICE TRAP

[75] Inventor: Roy S. Thomas, Jr., Hopewell, Va.

[73] Assignee: Allied-Signal Inc., Morris Township, Morris County, N.J.

[21] Appl. No.: 809,603

[22] Filed: Dec. 16, 1985

[51] Int. Cl.⁴ .............................................. F16K 5/08
[52] U.S. Cl. .................................... 251/207; 138/45
[58] Field of Search .......................... 251/207; 138/45

[56] References Cited

U.S. PATENT DOCUMENTS 4,130,128  12/1978  Kaneko ............................ 137/269

FOREIGN PATENT DOCUMENTS 2531809  1/1976  Fed. Rep. of Germany ...... 251/207
742662   7/1980  U.S.S.R. ............................... 251/207

OTHER PUBLICATIONS

Jamesbury Corp. Bulletin 212, "Type 1000 Screwed End Ball Valves ¼ to 2"".
W-K-M Valve Division, Houston, Texas, Bulletin B-165M, "Installation, Operation and Maintenance of W-K-M DynaSeal 310 Ball Valves".

Primary Examiner—Robert G. Nilson

[57] ABSTRACT

An assembly for removing liquid from a pressurized gaseous system, such as condensate from a steam line, contains a rotatable stopper member with a restriction orifice which provides for removal of condensate with only a minor, controlled loss of steam. The orifice can be rotated 180° to the pressure flow, thus allowing the pressure to blow out any trash that becomes lodged on or in the orifice. The stopper member can additionally be rotated so that a larger blow-down port is in the line of flow, thus permitting the removal of trash and excess liquid that may accumulate in the line.

3 Claims, 2 Drawing Sheets

IN-RUN CLEANABLE ORIFICE TRAP

BACKGROUND OF THE INVENTION

1. Field of the Invention.

The invention relates to an assembly for removing liquid from a pressurized gaseous system. Particular applications are the removal of condensate from pressurized steam lines and water from pressurized air lines. The assembly is characterized as an orifice steam trap or liquid drainer.

2. Description of Related Art.

The use of a fixed plate containing a restrictive orifice to control drainage of steam condensate is disclosed in U.S. Pat. No. 3,715,870 to Guzick, issue date Feb. 13, 1973 and in U.S. Pat. No. 3,877,895 to Wonderland et al., issue date Apr. 15, 1975. Orifice steam traps tend to plug with trash unless protected by fine mesh strainers. A special problem arises with steam traps that drain condensate from gut or integral tracing on sulfur lines. If sulfur enters the tracing though a hole in the tracer wall, the sulfur eventually enters the steam trap as a liquid above 250° F. The sulfur solidifies and fouls the orifice which stops condensate flow. Heat transfer stops and sulfur may freeze in the pipeline. A plugged orifice requires that the trap be removed from service for cleaning.

SUMMARY OF THE INVENTION

An assembly for removing liquid from a pressurized gaseous system, such as condensate from a steam line, contains a rotatable stopper member with a restriction orifice. The restriction orifice in the stopper member provides for removal of condensate with only a minor, controlled loss of steam. The stopper member is rotatable so that the orifice can be rotated 180° to the pressure flow, thus allowing the pressure to blow out any trash that becomes lodged on or in the orifice without having to remove the assembly from service for cleaning. A preferred embodiment includes a much larger blow-down port in the stopper member in addition to the restriction orifice. The stopper member can be rotated so that the blow-down port is in the line of flow, thus permitting the removal of trash and excess liquid that may accumulate in the line.

DESCRIPTION OF THE PREFERRED EMBODIMENT

Figure 1:
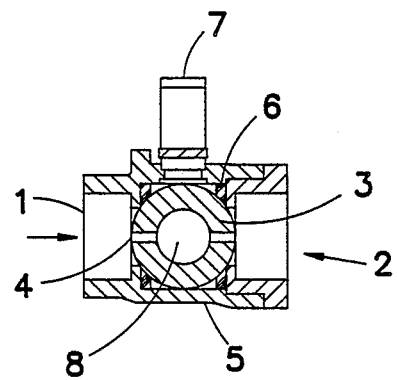
FIG. 1 is a side sectional view of an assembly with a spherical stopper member with the restriction orifice positioned in normal trap operating position.
Figure 3A:
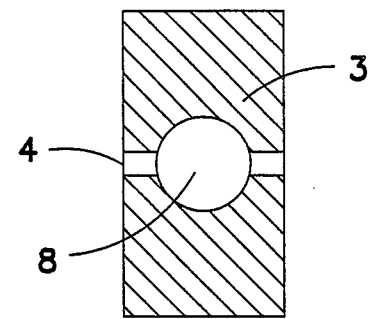
FIGS. 3a and 3b are side sectional views of a cylindrical stopper member as an alternative embodiment to the spherical stopper member of FIGS. 1 and 2.
Figure 3B:
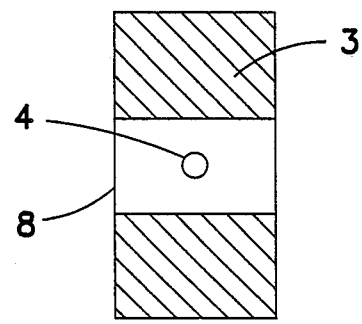

Referring in detail to the drawings, FIG. 1 illustrates an assembly embodying the invention which provides for liquid discharge from a pressurized gaseous system such as a steam line. The upstream flow opening 1 is connected to the pressurized gaseous system and the arrow indicates the pressure flow. Downstream flow opening 2 can be open to the atmosphere or connected to a convenient discharge line. Stopper member 3 illustrated is a spherical element, similar in many respects to a ball valve. The stopper member 3 has a restriction orifice 4 which provides substantially all communication between the upstream pressure flow and downstream discharge flow. The stopper member can also be of various other configurations including a straight or truncated cylinder (see FIGS. 3a and 3b) and a plate or disk. The stopper member may be made from any suitable material for the environment contemplated.

In practice the restriction orifice permits liquid to flow through along with a controlled loss of gas. The diameter or the orifice is determined by the pressure differential ($\Delta p$) between the upstream and downstream pressure within the particular gas system and by the liquid load. The purpose of the restriction orifice is to minimize the loss of gas while at the same time effecting desired liquid discharge. For a given liquid load, at lower $\Delta p$ the restriction orifice must be of a larger diameter whereas at higher $\Delta p$ the diameter should be reduced to minimize gas loss. Once the diameter of the restriction orifice has been established for a given system, no further changes need be made and the assembly will operate with minimum maintenance.

The stopper member 3 is rotatably mounted in housing means 5 with gaskets 6 disposed therebetween to provide an appropriate seal and to prevent excessive loss of gas. It is apparent from FIG. 1 that should trash clog the restriction orifice, the stopper member can be readily rotated 180° by handle 7, thus permitting the gas pressure to blow out such trash. This facilitates cleaning of the restriction orifice without need of disassembly and without tasking the line out of service. Thus, the assembly can be characterized as an In-Run Cleanable Orifice (IRCO) trap.

A preferred embodiment of the invention includes blow-down means associated with the stopper member for trash and excess liquid blow-off. The stopper member can be rotated to a position providing communication between the upstream flow opening and downstream flow opening through the blow-down means, thus permitting accumulated trash and excess liquid to be blown off. The blow-down means allows removal of the large volume of liquid that forms when a steam system is warmed up or an air system is upset. If the stopper member is a plate or disk configuration, rotating the member to a position substantially parallel to the pressure flow provides such blow-down means. If the stopper member is a sphere or cylinder, blow-down means may comprise channels or grooves in the sides of the member or a port extending through the member.

Figure 2:
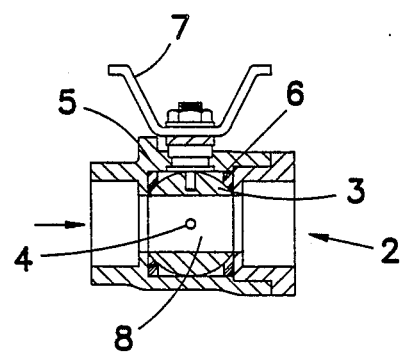
FIG. 2 is a side sectional view where the spherical stopper member of FIG. 1 has been rotated about 90° to the blow-down position permitting removal of trash or excess liquid.

In FIG. 1, a preferred blow-down means is shown as blow-down port 8 which extends through spherical stopper member 3 substantially at right angles to, and intersecting with, the restriction orifice. The blow-down port 8 is substantially larger than restriction orifice 4. FIG. 1 shows the stopper member 3 in a normal operating position wherein the restriction orifice 4 provides communication between the upstream and downstream flow. In FIG. 2, the plug member 3 has been rotated about 90° whereby blow-down port 8 provides substantially increased communication between the upstream and downstream flow to permit accumulated trash and excess liquid to pass through. After the 90° rotation shown in FIG. 2, the stopper member can be rotated an additional 90°, thereby reversing the position shown in FIG. 1. In this manner, the reversing of pressure forces serves to blow-out materials which have deposited within the orifice.

The embodiment of FIG. 1 offers an additional advantage. In the position shown, with blow-down port 8 intersecting restriction orifice 4, it is seen that blow-down port 8 serves as an expansion chamber and that restriction orifice 4 is actually two orifices in series. This arrangement reduces erosion of the restriction orifice.

Due to the ease of removing accumulated trash and cleaning any trash from the restriction orifice, it will be readily appreciated by those of skill in the art that it becomes unnecessary to mount strainers in the front of the orifice or to mount Y-strainers with blow-down valves upstream of the trap as has been customary.

The assembly of this invention can be utilized for the discharge of liquid or condensate from any pressurized gaseous systems, including steam lines, compressed air system, and the like. Many other modifications, variations and uses of the present invention are possible in light of the above teachings.

What is claimed:

1. An assembly for removing liquid from a pressurized gaseous system comprising
    housing means having an upstream flow opening adapted to be mounted to the pressurized gaseous system and a downstream flow opening adapted for the discharge of the liquid,
    a stopper member rotatably mounted within the housing means between the upstream flow opening and the downstream flow opening, said stopper member comprising a restriction orifice extending through the stopper member and a blow-down port of substantially greater diameter than the restriction orifice, said port extending through the stopper member substantially at right angles to and intersecting with the restriction orifice,
    whereby said stopper member is rotatable from a first position wherein said stopper member is sealably engaged with the housing means and said restriction orifice provides substantially all communication between said upstream flow opening and said downstream flow opening to a second position substantially 180° from said first position wherein said stopper member is sealably engaged with the housing means and said restriction orifice is reversed from said first position, and to a blow-down position intermediate said first position and said second position wherein said blow-down port provides substantially all communication between said upstream flow opening and said downstream flow opening.

2. The assembly of claim 1 wherein said stopper member is substantially spherical.

3. The assembly of claim 1 wherein said stopper member is substantially cylindrical.

* * * * *